United States Patent
Lin

(10) Patent No.: US 8,816,737 B1
(45) Date of Patent: Aug. 26, 2014

(54) INTERFACE CIRCUIT FOR SIGNAL TRANSMISSION

(71) Applicant: Novatek Microelectronics Corp., Hsinchu (TW)

(72) Inventor: Ying-Zu Lin, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 13/972,921

(22) Filed: Aug. 22, 2013

(30) Foreign Application Priority Data

Mar. 4, 2013 (TW) .............................. 102107545 A

(51) Int. Cl.
*H03K 5/01* (2006.01)

(52) U.S. Cl.
USPC ........................................................ 327/166

(58) Field of Classification Search
USPC ........................................................ 327/166
See application file for complete search history.

(56) References Cited

U.S. PATENT DOCUMENTS

2011/0058635 A1* 3/2011 Ko et al. ...................... 375/362

* cited by examiner

*Primary Examiner* — Daniel Rojas
(74) *Attorney, Agent, or Firm* — Jianq Chyun IP Office

(57) ABSTRACT

An interface circuit for signal transmission includes an amplifying circuit, a de-skew circuit and a latching unit. The amplifying circuit receives an input clock signal and outputs an output clock signal after amplifying the input clock signal. The de-skew circuit receives the output clock signal and outputs a de-skew clock signal as a trigger signal after removing a skew time of the output clock signal. The latching unit includes multiple sampling circuits, respectively receives multiple inputting data signals. The sampling circuits are controlled by the trigger signal to sample the inputting data signals and output multiple outputting data signals. The voltage amplitudes of the outputting data signals are larger than the voltage amplitudes of the inputting data signals and satisfy a required voltage amplitude by a subsequent circuit.

15 Claims, 4 Drawing Sheets

INTERFACE CIRCUIT FOR SIGNAL TRANSMISSION

CROSS-REFERENCE TO RELATED APPLICATION

This application claims the priority benefit of Taiwan application serial no. 102107545, filed on Mar. 4, 2013. The entirety of the above-mentioned patent application is hereby incorporated by reference herein and made a part of this specification.

BACKGROUND

1. Field of Invention

The present invention relates to interface circuit for signal transmission, suitable for use in wire communication system.

2. Description of Related Art

In applications of wire transmission, the conventional interface circuit for parallel signal receiver uses amplifying circuits to amplify the small amplitude of voltage signals into the amplitude in digital level. The parallel signal receiver needs one amplifier to amplify the clock signal and multiple amplifiers to amplify the data signals.

FIG. 1 is a circuit, schematically illustrating a conventional parallel interface circuit. In FIG. 1, the small signals to be transmitted include the clock signal clk and multiple input data signals, indicated by data 1, data 2, ..., data n. The subsequent circuit after the interface circuit needs the signals with larger voltage amplitude. In conventional manner, each path for the small signals of clock signal and multiple data signals, data 1, data 2, ..., data n needs to implement an amplifying circuit, 100_0, 100_1, ..., 100_n, so as to amplify these small signals to the large output signals as the clock signal CLK and multiple data signals, indicated by DATA 1, DATA 2, ..., DATA n.

In this conventional interface circuit, the total power and area consumption is depending on the number of data signals, in which each path of data signals is implemented with an amplifying circuit. The amplifying circuit in operation would have a static current, which causes further power consumption. In addition to the application of wire signal transmission, because the signals at the transmitting end has uncertainties, such as factors of amplitude size, signals quality, and level of common mode voltage, the performance of amplifying circuits at the receiving end need to adapt the wide range of the level of common mode voltage, high operation frequency, and gain. Thus, design of the amplifying circuit needs to have high gain, high operation frequency and high range of input voltage level. This design would also cause more power consumption.

SUMMARY OF THE INVENTION

The invention provides an interface circuit for signal transmission in exemplary embodiment, which can reduce the power consumption and can also reduce the circuit area.

In an exemplary embodiment of the invention, an interface circuit for signal transmission is provided, including an amplifying circuit, a de-skew circuit and a latching unit. The amplifying circuit receives an input clock signal and outputs an output clock signal after amplifying the input clock signal. The de-skew circuit receives the output clock signal and outputs a de-skew clock signal as a trigger signal after removing a skew time of the output clock signal. The latching unit includes multiple sampling circuits, respectively receives multiple inputting data signals. The sampling circuits are controlled by the trigger signal to sample the inputting data signals and output multiple outputting data signals. The voltage amplitudes of the outputting data signals are larger than the voltage amplitudes of the inputting data signals and satisfy a required voltage amplitude by a subsequent circuit.

In an exemplary embodiment of the invention, an interface circuit for signal transmission is provided, including an amplifying circuit, a de-skew circuit, a delay chain circuit, an edge detector, a multiplexer, and a latching unit. The amplifying circuit receives an input clock signal and outputs an output clock signal after amplifying the input clock signal. The de-skew circuit receives the output clock signal and outputs a de-skew clock signal after removing a skew time of the output clock signal. The delay chain circuit receives the output clock signal and produces a set of reference clock signals according to the output clock signal, including 1 to m clock signals, where m is positive number and m≥2. Each of the $2^{nd}$ to the $m^{th}$ clock signals is delayed with respect to the $1^{st}$ clock signal has a delay time, respectively and differently, and the delay time is not greater than one clock cycle. The edge detector receives the set of reference clock signals and determines which one of the set of reference clock signals is approximate to the de-skew clock signal, and output a selection signal. The multiplexer receives the set of reference clock signals and outputs a trigger signal, according to the selection signal. The latching unit comprises multiple sampling circuits, respectively receiving multiple inputting data signals, wherein the sampling circuits are controlled by the trigger signal to sample the inputting data signals and output multiple outputting data signals. Voltage amplitudes of the outputting data signals are larger than voltage amplitudes of the inputting data signals and satisfy a required voltage amplitude by a subsequent circuit.

In an exemplary embodiment of the invention, an interface circuit for signal transmission is provided, including an amplifying circuit, a de-skew circuit, a clock signal generating unit, and a latching unit. The amplifying circuit receives an input clock signal and outputs an output clock signal after amplifying the input clock signal. The de-skew circuit receives the output clock signal and outputs a de-skew clock signal after removing a skew time of the output clock signal. The clock signal generating unit receives the output clock signal and the de-skew clock signal and outputs a trigger signal delayed from the output clock signal, according to a delay relation between the output clock signal and the de-skew clock signal. The latching unit comprises multiple sampling circuits, respectively receiving multiple inputting data signals, wherein the sampling circuits are controlled by the trigger signal to sample the inputting data signals and output multiple outputting data signals. The voltage amplitudes of the outputting data signals are larger than voltage amplitudes of the inputting data signals and satisfy a required voltage amplitude by a subsequent circuit.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

In considering the conventional interface circuit, each route in the parallel signal transmission is implemented with an amplifying circuit. In operation, all of the amplifying circuits remain at the ON state. Even if there is no signal to be transmitted, the amplifying circuits are still at the ON state, consuming the power. In addition, because multiple amplifying circuits are used, it causes the increase of circuit area.

An embodiment of the invention uses a sampling circuit to replace the amplifying circuits, so as to directly sample the digital input data signals in small amplitude. The mechanism to drive the sampling circuit can be triggered by using the same clock signal.

The sampling circuit can be the latching circuit or the comparator as an example and can sample the signals triggered by the clock signal so as to obtain the current amplitude of the input data signals. The latching circuit samples the signal only when the trigger signal is received without staying at the ON state for long period. Thus, the sampling circuit consumes the power, dynamically and the circuit area is relative smaller. In the following descriptions, the lathing circuit is taken as the sampling circuit for description.

The invention is not limited to multiple embodiments as provided, and does not exclude the other proper combination between the exemplary embodiments.

Figure 1:
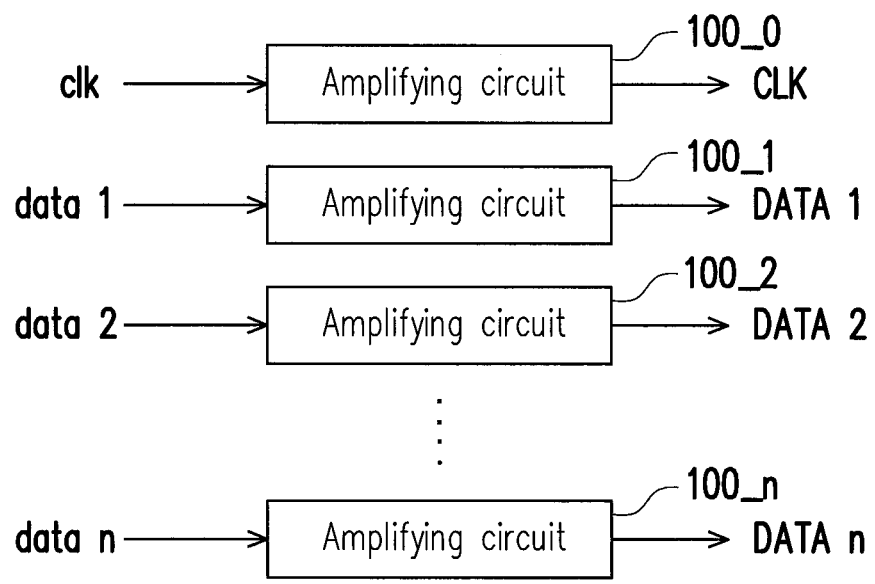
FIG. 1 is a circuit, schematically illustrating a conventional parallel interface circuit.
Figure 2:
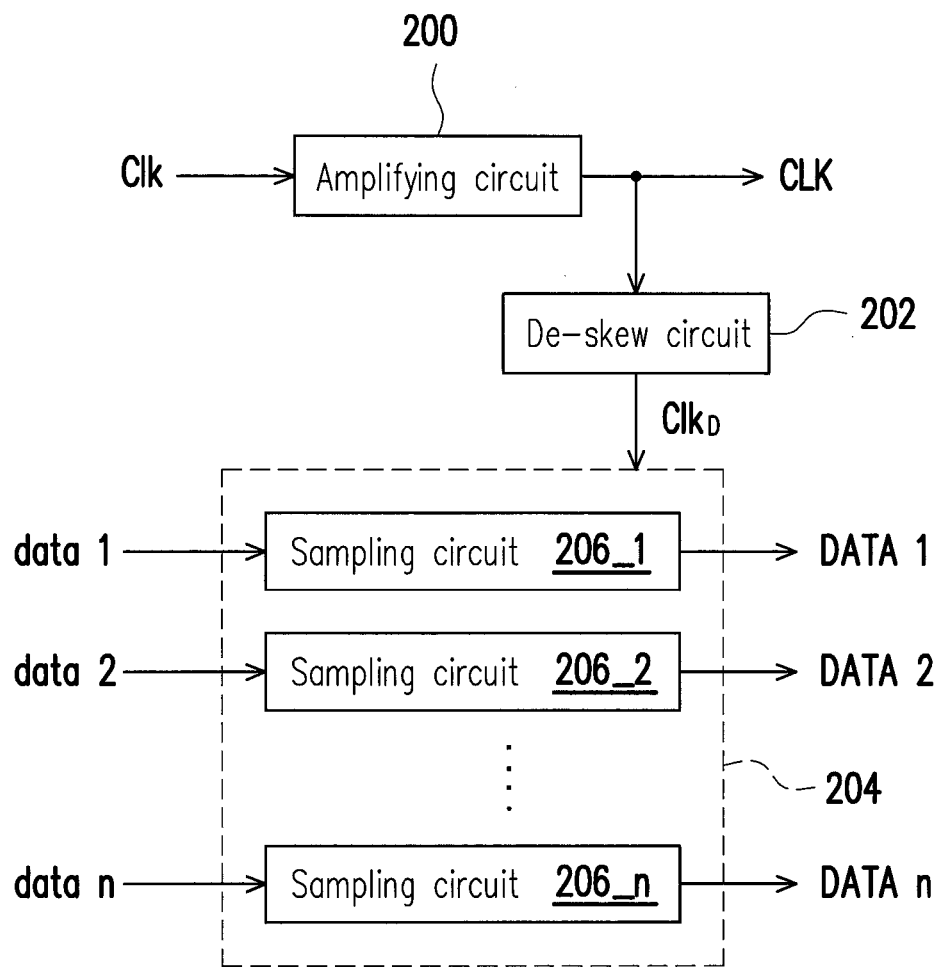
FIG. 2 is a circuit diagram, schematically illustrating an interface circuit for signal transmission, according to an exemplary embodiment of the invention.

FIG. 2 is a circuit diagram, schematically illustrating an interface circuit for signal transmission, according to an exemplary embodiment of the invention. In FIG. 2, generally, the interface circuit for signal transmission includes an amplifying circuit 200, a de-skew circuit 202, and a latching unit 204. The amplifying circuit 200 receives an input clock signal clk and outputs an output clock signal CLK after amplifying the input clock signal clk. The de-skew circuit 202 receives the output clock signal CLK and remove a skew time caused by the amplifying circuit 200. After then, the original clock timing can be recovered, and a de-skew clock signal $Clk_D$ is outputted to serve as a trigger signal. The latching unit 204 includes multiple sampling circuits 206_1, 206_2, ..., 206_n, respectively receives multiple inputting data signals data 1, data 2, ..., data n. These sampling circuits are controlled by the de-skew clock signal $Clk_D$ to sample the inputting data signals and output multiple outputting data signals DATA 1, DATA 2, ..., DATA n. The voltage amplitudes of the outputting data signals are larger than the voltage amplitudes of the inputting data signals and satisfy a required voltage amplitude by a subsequent circuit.

The issue of skew time during amplifying the clock signal can be solved by the de-skew circuit 202. The de-skew circuit 202 is a phase locked loop (PLL) or a delay-locked loop (DLL).

In an exemplary embodiment, a single amplifying circuit 200 is used and the timing of the clock signal is recovered based on the single amplifying circuit 200. Then, the recovered clock signal is used to drive the latching circuit or the comparator to sample the data. In this design, power consumption and circuit area due to the amplifying circuits in the conventional design can be reduced.

In the exemplary embodiment, the de-skew circuit 202 cam remain at the ON state. However, the clock signal is the same for one time of transmitting data. In other words, after the de-skew circuit 202 removes the skew factors and recovers the original timing of the clock signal, the timing is not further changed. If the consideration on reducing power consumption is further taken, the circuit can be further modified.

Figure 3:
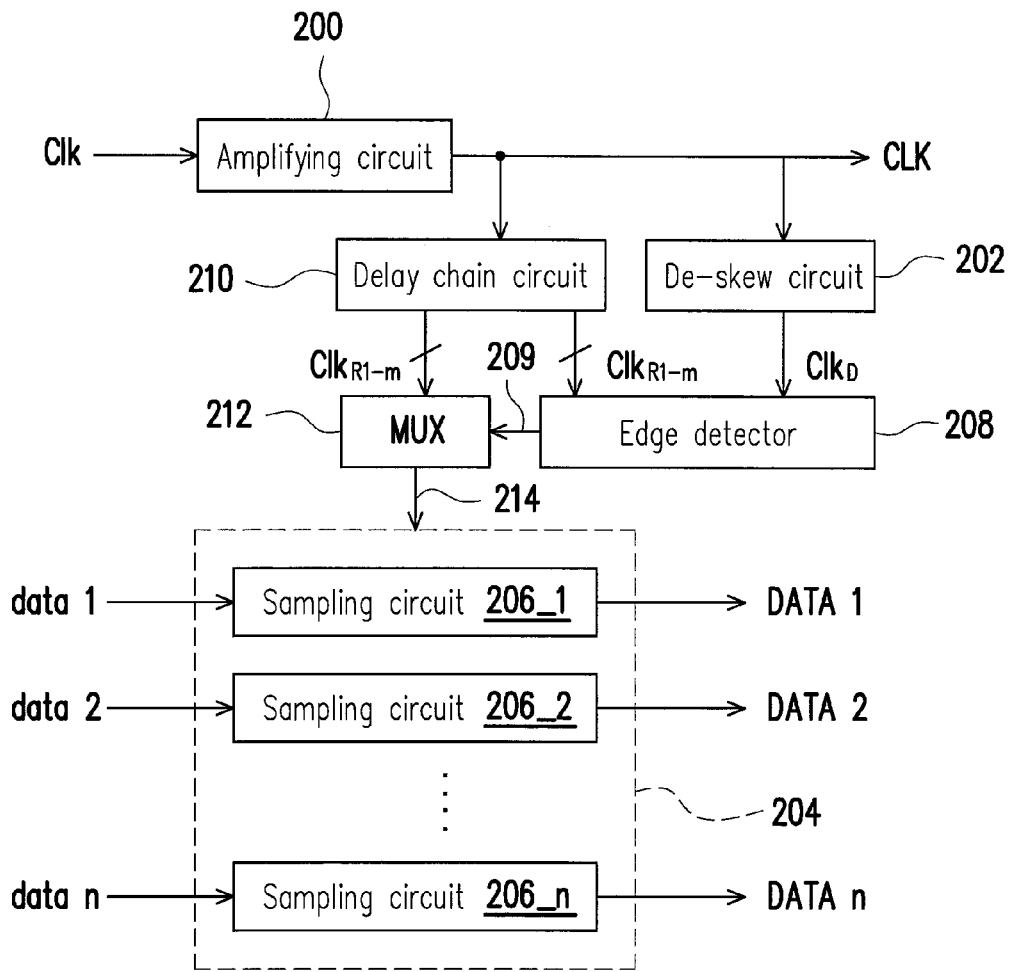
FIG. 3 is a circuit diagram, schematically illustrating an interface circuit for signal transmission, according to an exemplary embodiment of the invention.

FIG. 3 is a circuit diagram, schematically illustrating an interface circuit for signal transmission, according to an exemplary embodiment of the invention. In FIG. 3, an interface circuit for signal transmission can include an amplifying circuit 200, a de-skew circuit 202, a delay chain circuit 210, an edge detector 208, a multiplexer (MUX) 212, and a latching unit 204. The amplifying circuit 200 receives an input clock signal Clk and outputs an output clock signal CLK after amplifying the input clock signal Clk. The de-skew circuit 202 receives the output clock signal CLK and outputs a de-skew clock signal $Clk_D$ after removing a skew time of the output clock signal CLK.

The delay chain circuit 210 receives the output clock signal CLK, and produces a set of reference clock signals $Clk_{R1-m}$ according to the output clock signal CLK, including 1 to m clock signals, where m is positive number and m≥2, each of the $2^{nd}$ to the $m^{th}$ clock signals is delayed with respect to the $1^{st}$ clock signal has a delay time, respectively and differently, and the delay time is not greater than one clock cycle.

Figure 4:
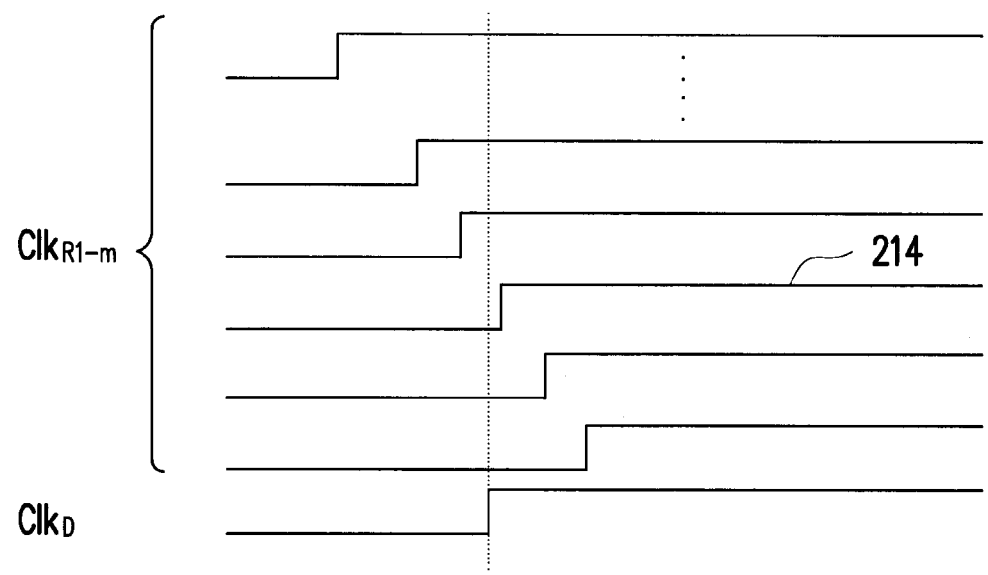
FIG. 4 is a drawing, schematically illustrating the detecting mechanism for the edge detector with on set of reference clock signals.

FIG. 4 is a drawing, schematically illustrating the detecting mechanism for the edge detector with on set of reference clock signals. In FIG. 4, the set of reference clock signals $Clk_{R1-m}$ produced by the delay chain circuit 210 are multiple clock signals, but there are predetermined delay times between the clock signals. The clock signals are in timing are distributed within one clock cycle. The delay times between the clock signals are equal, for example. In other words, m clock signals are uniformly distributed in one clock cycle. The mechanism for edge detection is to be described below.

Still referring to FIG. 3 and FIG. 4, the edge detector 208 receives the set of reference clock signals $Clk_{R1-m}$, and determines which one of the set of reference clock signals $Clk_{R1-m}$ is the most approximate to the de-skew clock signal $Clk_D$ and then correspondingly outputs a selection signal 209. The set of reference clock signals $Clk_{R1-m}$ are constantly produced by the delay chain circuit without consuming much power. After the de-skew clock signal $Clk_D$ is generated, the timing of the pulse edge is indicated by dotted line. The one of the set of reference clock signals $Clk_{R1-m}$, which is before or after the dotted line and is the most approximate to the dotted line, is detected out to serve as the trigger signal 214. Since the time phase of the trigger signal 214 is about the same as the de-skew clock signal $Clk_D$, it does not cause sampling error and can replace the de-skew clock signal $Clk_D$. After then, the de-skew circuit 202 can be turned off to further reduce the power consumption.

However, a multiplexer 212 can be used, as an example, to select the one of the set of reference clock signals $Clk_{R1-m}$ and outputs as the trigger signals 214.

The multiplexer 212 receives the set of reference clock signals $Clk_{R1-m}$ and output a trigger signal 214 according to the selection signal 209 determined by the detection of the edge detector 208. The properties are shown in FIG. 4, as an example.

The latching unit 204 comprises multiple sampling circuits 206_1, 206_2, ..., 206_n, respectively receiving multiple inputting data signals data 1, data 2, ..., data n. These sampling circuits are controlled by the de-skew clock signal $Clk_D$ to sample the inputting data signals and output multiple outputting data signals DATA 1, DATA 2, ..., DATA n. The voltage amplitudes of the outputting data signals are larger than the voltage amplitudes of the inputting data signals and satisfy a required voltage amplitude by a subsequent circuit.

In the exemplary embodiment, the edge detector 208 and the delay chain circuit 210 are added. After the determination from the determining circuit, in most of operation time, the de-skew circuit 202 can be turned off to save power consumption. Comparison to the convention interface, the exemplary embodiment can reduce the power consumption and circuit area.

From the circuit function, the edge detector 208, the delay chain circuit 210 and the multiplexer 212 can be treated as a clock signal generating unit, which has the function to receive the output clock signal CLK and the de-skew clock signal $Clk_p$. The trigger signal 214, respectively delaying from the output clock signal, is generated, according to a delay relation between the output clock signal CLK and the de-skew clock signal $Clk_D$.

As to the function of the clock signal generating unit, the actual circuit design is not necessary to be limited to the edge detector 208, the delay chain circuit 210 and the multiplexer 212. As described in the exemplary embodiment of the clock signal generating unit, the delay time between the output clock signal CLK and the de-skew clock signal $Clk_D$ can be directly detected, and then the trigger signal 214 can be directly obtained by delay from the output clock signal CLK. After the delay time has been detected out, the de-skew circuit 202 can be turned off as the actual need.

However, if the power consumption has been reaching to acceptable level, it can be like the structure in FIG. 2 without turning off the de-skew circuit 202. It can still save the power consumption and the circuit area.

It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:

1. An interface circuit for signal transmission, comprising:
an amplifying circuit, receiving an input clock signal and outputting an output clock signal after amplifying the input clock signal;
a de-skew circuit, receiving the output clock signal and outputting a de-skew clock signal as a trigger signal after removing a skew time of the output clock signal; and
a latching unit, comprising multiple sampling circuits, respectively receiving multiple inputting data signals, wherein the sampling circuits are controlled by the trigger signal to sample the inputting data signals and output multiple outputting data signals,
wherein voltage amplitudes of the outputting data signals are larger than voltage amplitudes of the inputting data signals and satisfy a required voltage amplitude by a subsequent circuit.

2. The interface circuit for signal transmission of claim 1, wherein the de-skew circuit is a phase locked loop or a delay-locked loop.

3. The interface circuit for signal transmission of claim 1, wherein the output clock signal and the output data signals are transmitted by wire communication.

4. The interface circuit for signal transmission of claim 1, wherein the sampling circuits of the latching unit are latching circuits or comparators.

5. An interface circuit for signal transmission, comprising:
an amplifying circuit, receiving an input clock signal and outputting an output clock signal after amplifying the input clock signal;
a de-skew circuit, receiving the output clock signal and outputting a de-skew clock signal after removing a skew time of the output clock signal;
a delay chain circuit, receiving the output clock signal, and producing a set of reference clock signals according to the output clock signal, including 1 to m clock signals, where m is positive number and m≥2, each of the $2^{nd}$ to the $m^{th}$ clock signals is delayed with respect to the $1^{st}$ clock signal has a delay time, respectively and differently, and the delay time is not greater than one clock cycle;
an edge detector, receiving the set of reference clock signals and determining which one of the set of reference clock signals is approximate to the de-skew clock signal, and output a selection signal;
a multiplexer, receiving the set of reference clock signals and outputting a trigger signal, according to the selection signal; and
a latching unit, comprising multiple sampling circuits, respectively receiving multiple inputting data signals, wherein the sampling circuits are controlled by the trigger signal to sample the inputting data signals and output multiple outputting data signals,
wherein voltage amplitudes of the outputting data signals are larger than voltage amplitudes of the inputting data signals and satisfy a required voltage amplitude by a subsequent circuit.

6. The interface circuit for signal transmission of claim 5, wherein the de-skew circuit a phase locked loop or a delay-locked loop.

7. The interface circuit for signal transmission of claim 5, wherein the output clock signal and the output data signals are transmitted by wire communication.

8. The interface circuit for signal transmission of claim 5, wherein the set of reference clock signals is uniformly distributed within one clock cycle.

9. The interface circuit for signal transmission of claim 5, wherein the selection signal remains a same one after being selected and at least the de-skew circuit is turned off.

10. The interface circuit for signal transmission of claim 5, wherein the sampling circuits of the latching unit are latching circuits or comparators.

11. An interface circuit for signal transmission, comprising:
an amplifying circuit, receiving an input clock signal and outputting an output clock signal after amplifying the input clock signal;
a de-skew circuit, receiving the output clock signal and outputting a de-skew clock signal after removing a skew time of the output clock signal;
a clock signal generating unit, receiving the output clock signal and the de-skew clock signal and outputting a trigger signal delayed from the output clock signal, according to a delay relation between the output clock signal and the de-skew clock signal; and
a latching unit, comprising multiple sampling circuits, respectively receiving multiple inputting data signals, wherein the sampling circuits are controlled by the trigger signal to sample the inputting data signals and output multiple outputting data signals, wherein voltage amplitudes of the outputting data signals are larger than voltage amplitudes of the inputting data signals and satisfy a required voltage amplitude by a subsequent circuit.

12. The interface circuit for signal transmission of claim 11, wherein the de-skew circuit a phase locked loop or a delay-locked loop.

13. The interface circuit for signal transmission of claim 11, wherein the output clock signal and the output data signals are transmitted by wire communication.

14. The interface circuit for signal transmission of claim 11, wherein the selection signal remains a same one after being selected and at least the de-skew circuit is turned off.

15. The interface circuit for signal transmission of claim 11, wherein the sampling circuits of the latching unit are latching circuits or comparators.

* * * * *